United States Patent [19]

Dischert

[11] 4,357,641
[45] Nov. 2, 1982

[54] TAPE GUIDE WITH PATH LOCATION AND ATTITUDE ADJUSTMENTS

[75] Inventor: William A. Dischert, Jobstown, N.J.

[73] Assignee: RCA Corporation, New York, N.Y.

[21] Appl. No.: 138,736

[22] Filed: Apr. 9, 1980

[51] Int. Cl.³ .............................................. G11B 15/16
[52] U.S. Cl. .................................................. 360/130.23
[58] Field of Search .................. 360/84, 130.23, 130.24

[56] References Cited

U.S. PATENT DOCUMENTS 4,122,506 10/1978 Kubo et al. ..................... 360/130.23
4,264,506 4/1981 Kabacinski ..................... 360/130.23

Primary Examiner—Aristotelis M. Psitos
Attorney, Agent, or Firm—Eugene M. Whitacre; Paul J. Rasmussen; William H. Meise

[57] ABSTRACT

To facilitate the adjustment of both the location of the tape path over the surface of a scanner and the attitude of the tape relative to that surface in a record and/or replay system, a tape guide is arranged to provide for such adjustments to be made in a common direction that is substantially parallel to the plane of the tape.

7 Claims, 3 Drawing Figures

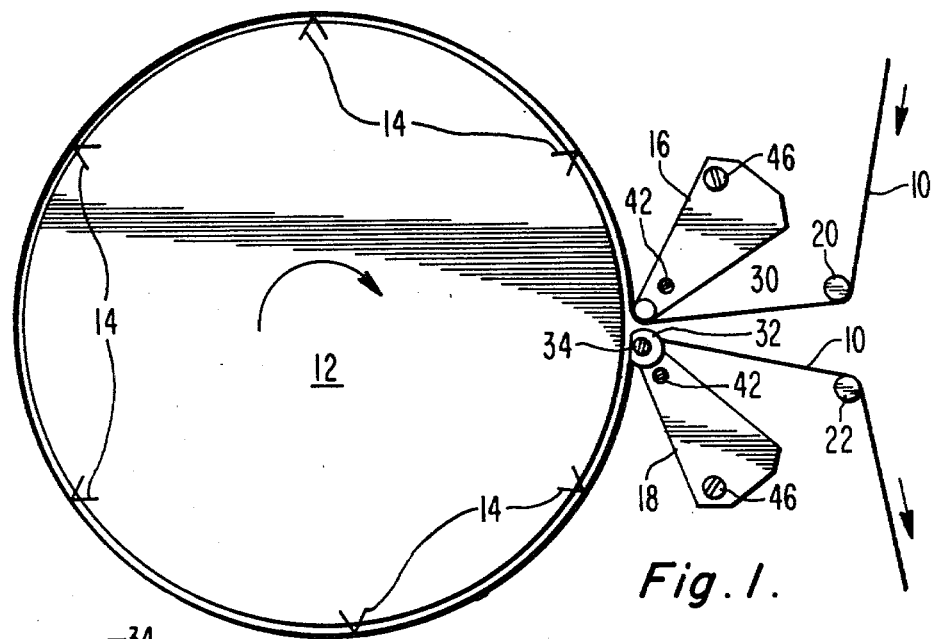
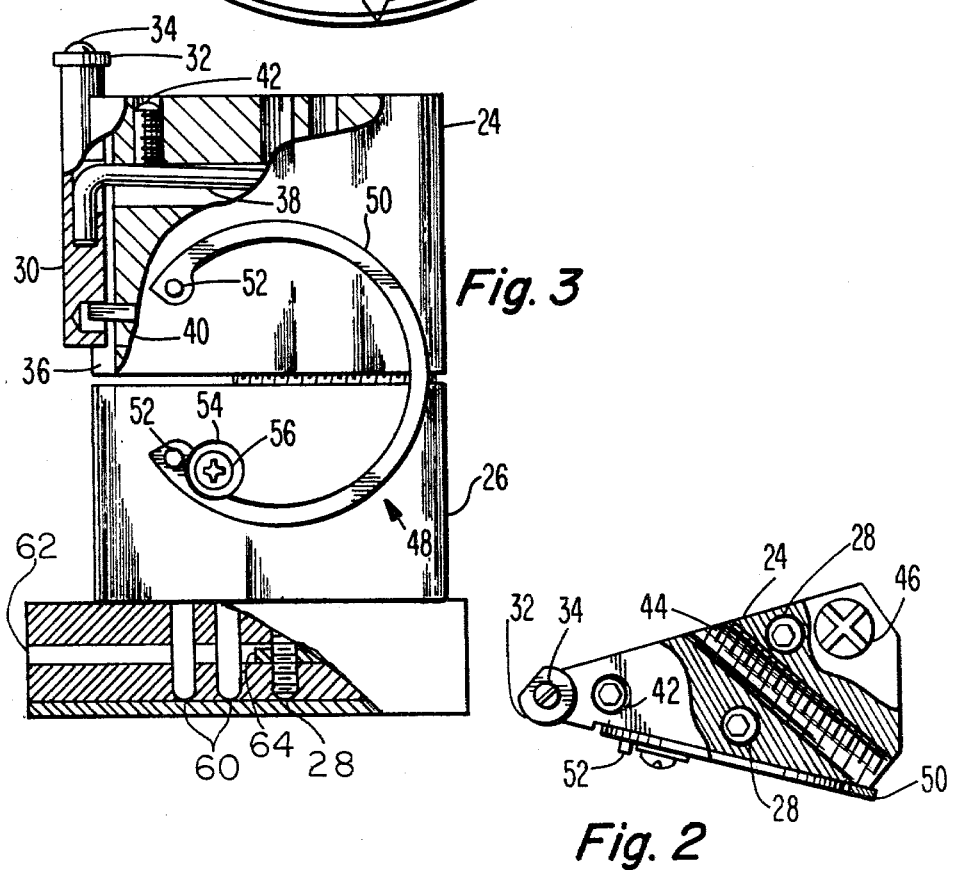

TAPE GUIDE WITH PATH LOCATION AND ATTITUDE ADJUSTMENTS

BACKGROUND OF THE INVENTION

In helical scan tape record and/or replay systems, the tape travels in a loop around a peripheral portion of a rotating scanner having transducers disposed about its periphery. At the beginning and the end of this loop the tape travels about a guide or a post to change the direction of its path. If the transducers on the scanner are to follow the intended track pattern on the tape, the location of the tape path over the cylindrical surface of the scanner and the attitude of the tape path relative to the cylindrical surface of the scanner must be precisely maintained. Because of tolerances between the parts of the scanner and the tape guides, the required precision can best be attained by adjustment while the record and/or replay system is operative with the tape moving along its path and the scanner rotating. Adjustable tape guides for this purpose are known however, many problems are encountered with such tape guides. The main problem with these tape guides is that they must be manually adjusted at inaccessible locations with specially designed tools, so that only those possessing above average manual dexterity and having long experience with the particular record and/or replay systems can make these adjustments. Some of the other problems encountered with prior art adjustable tape guides are that their rather complex design results in high manufacturing expense and that they provide extremely limited access for threading the tape in its path of travel.

SUMMARY OF THE INVENTION

A tape guide is provided to facilitate the adjustment of both the location of the tape path over the cylindrical surface of the scanner and the attitude of the tape relative to the cylindrical surface of the scanner by providing for such adjustments to be made in a common direction that is substantially parallel to the plane of the tape for greatest accessibility. Furthermore, other less troublesome adjustments can also be made in this common direction, such as the track scan length on the tape.

BRIEF DESCRIPTION OF THE DRAWINGS

FIG. 1 illustrates a portion of a helical scan record and/or replay system wherein tape guides in accordance with one preferred embodiment of the invention are utilized;

FIG. 2 is a cutaway view in the common adjustment direction of the tape guides in FIG. 1, which illustrates its tape path attitude adjustment feature; and FIG. 3 is a cutaway view on one side of the tape guides in FIG. 1, which illustrates its tape path location adjustment feature.

DESCRIPTION OF THE PREFERRED EMBODIMENTS

A portion of a record and/or replay system is shown in FIG. 1 wherein magnetic tape 10 is guided in a loop around a cylindrical portion of a scanner 12 having transducers 14 disposed about its cylindrical surface. Tape guides 16 and 18 are disposed to direct the tape 10 into and out of the loop and the location of these guides determine the extent of the loop around the cylindrical portion of the scanner 12. The tape 10 enters this loop after passing over a tape guide 20 from a source (not shown) and passes to storage (not shown) over a tape guide 22 when it departs from this loop. Relative to the cylindrical surface on the scanner 12, the tape path enters the loop at one height and departs from the loop at another height so that the loop is of helical configuration. To show how the direction of tape travel is changed by the tape guides 16 and 18, the tape edge guide is not included on the tape guide 16 but tape guide 18 is shown as a complete unit.

During either record or replay operations, the scanner 12 rotates and therefore, the transducers 14 scan tracks across the tape 10 at an angle to the direction of tape travel. This tape scanning arrangement is conventional to the art except for the tape guides 16 and 18 which each include means for making adjustments to both the location of the tape path over the cylindrical surface of the scanner and the attitude of the tape path relative to that surface, in a common direction with these adjustments being facilitated by their common direction being substantially parallel to the plane of the tape.

Although many different embodiments of the tape guides 16 and 18 are possible, one preferred embodiment thereof is shown in the cutaway views of FIGS. 2 and 3. In this embodiment, a mounting block 24 is affixed to a base block 26 which in turn is affixed in the record and/or replay system, such as with screws 28. The tape location adjustment means includes a tape guide post 30 having a tape edge guide 32 affixed thereto, such as with a screw 34. The post 30 is slidably affixed on the block 24 such as in a groove 36. This slidable affixment can be accomplished in many ways and in this embodiment is accomplished with a rod 38 which retains the post 30 to the block 24 while a first spring means 40 is included for applying force through the post 30 to the rod 38 in one slidable direction of the post 30. The rod 38 is flexibly affixed within the block 24 and a screw 42 is threaded through the block 24 along an axis parallel with the plane of the tape to position the post 30 by deflecting the rod 38, which also applies a retaining force for pin 30. Spring means 40 can be any type of spring however, for purposes of compactness in this embodiment, it is a cantilevered member within the block 24. The tape path attitude adjustment means includes means for pivotally affixing the block 24 on the base 26. This pivotal affixment can be accomplished in many ways and in this embodiment is accomplished by interfacing the block 24 with the base 26 on a pivot pin 44, while retaining the block 24 to the base 26 with a screw 46 to one side of the pin 44 and with a second spring means 48 to the other side thereof for supplying a force of attraction between the block 24 and the base 26. The screw 46 is threaded into the base 26 through the block 24 along an axis parallel with the plane of the tape. Many different types of springs could be utilized as the second spring means 48 and to attain a compact tape guide, a "C" washer spring 50 is used in this embodiment. Pins 52 through the ends of the washer spring 50 retain it relative to both the block 24 and the base 26, while a washer 54 and screw 56 into either the block 24 or the base 26 retain it compactly against both the block 24 and the base 26.

As can be readily understood from FIG. 1, the location of the tape path over the cylindrical surface of the scanner 12 is adjustable where the tape 10 enters into and departs from its loop about the scanner 12. Depending on which end of the tape loop is to be adjusted, the screw 42 on the appropriate tape guide 16 or 18 is turned clockwise to change the location of the tape path in one direction and counter clockwise to change the location of the tape path in the other direction. Of course, the tape 10 wraps about the cylindrical surface of the post 30 under the tape edge guide 32 on each tape guide 16 and 18 so that when the screw 42 thereof is turned, the rod 38 and first spring means 40 move to slide the post 30 on the block 24. Since the edge guide 32 must move with the post 30, the location of the tape path relative to the cylindrical surface of the scanner 12 must change accordingly. The adjustability of the tape path attitude relative to the cylindrical surface of the scanner 12 where the tape 10 enters into and departs from its loop about the scanner 12 can also be understood from FIG. 1. Depending at which end of the tape loop the attitude is to be adjusted, the screw 46 on the appropriate tape guide 16 or 18 is turned clockwise to change the attitude of the tape path in one angular direction and counter clockwise to change the attitude of the tape path in the opposite angular direction. As the screw 46 turns, the block 24 moves in the desired direction relative to the base 26 about the pivot pin 44 against the force of the second spring means 48. Since the post 30 and the tape edge guide 32 must move with the block 24, the attitude of the tape path relative to the cylindrical surface of the scanner 12 must change accordingly. Because access to the screws 42 and 46 is in a common direction on the block 24 and that common direction is substantially parallel to the plane of the tape, the above-described adjustments are facilitated relative to such adjustments with prior art tape guides.

The pivot pin 44 is threaded in the tape guide embodiment shown in FIGS. 2 and 3, while the block 24 and base 26 both contain portions of mating threads therefor. With the threaded pivot pin 44 disposed in the mating threads of the block 24 and base 26, substantial affixment is therefore provided therebetween in both directions along the axis of pivot pin 44. Furthermore, adjustable means could be incorporated for varying the location of the post 30 to change the length of the tracks scanned on the tape 10 by the transducers 14 of the scanner 12. One such adjustable means is shown in FIG. 3 where alignment pins 60 protrude from the base 26 along with the screws 28 and pass into slots 62 in the record and/or replay systems. A sliding dog plate 64 in which threaded holes are disposed to receive the screws 28 would also be included in the record and/or replay system. By loosening the screws 28 to release the grip of the dog plate, the position of the base 26 can then be changed within the limits of the slots in the record and/or replay system to position the post 30 accordingly in establishing the precise length of the tape tracks.

What I claim is:

1. In a record and/or replay system of the type wherein tape travels in a loop around a cylindrical portion of a rotating scanner having transducers disposed about its cylindrical surface, the improvement comprising:

a tape guide for use at either the beginning or the end of the tape loop and including means for making adjustments to both the location of the tape path over the cylindrical surface of the scanner and the attitude of the tape path relative to the cylindrical surface of the scanner, in a common direction with said adjustments being facilitated by said common direction being substantially parallel to the plane of the tape; said tape path location adjustment is accomplished with a tape guide post having a tape edge guide affixed thereto and said tape guide post is slidably affixed on a mounting block to adjust the location of said tape edge guide along the axial direction of said tape guide post.

2. The tape guide of claim 1 wherein said tape guide post is affixed to said mounting block by a retaining rod flexibly affixed in said mounting block and spring means is included for applying force through said tape guide post to said rod in one slidable direction of said tape guide post, while a screw is threaded through said mounting block along an axis parallel to the plane of the tape for adjusting the position of said tape guide post by moving said rod relative to said spring means.

3. The tape guide of claim 1 wherein said tape attitude adjustment is accomplished with a mounting base and means for pivotally affixing said mounting block on said mounting base so that the attitude of said tape guide post relative to the cylindrical surface of the scanner changes in accordance with the pivotal position of said mounting block.

4. The tape guide of claim 3 wherein said mounting block is interfaced with said mounting base by a pivot pin while pivotal adjustment is provided therebetween with a screw and a spring means for applying force between said mounting block and said mounting base to one side of said pivot pin, said screw being threaded into said mounting base through said mounting block along an axis parallel to the plane of the tape and to the other side of said pivot pin for moving said mounting block relative to said mounting base and in cooperation with the force of said spring means.

5. The tape guide of claim 4 wherein said pivot pin is threaded and it is disposed between said mounting block and said mounting base in portions of mating threads to provide substantial affixment therebetween in both directions along its axis.

6. The tape guide of claim 3 wherein said mounting base is affixed relative to the scanner on a common base plate by adjustable means for varying the location of said tape guide post to change the length of the tracks scanned on the tape by the transducers of the scanner.

7. In a record and/or replay system of the type wherein tape travels in a loop around a cylindrical portion of a rotating scanner having transducers disposed about its cylindrical surface, the improvement comprising:

a tape guide for use at either the beginning or the end of the tape loop and including means for making adjustments to both the location of the tape path over the cylindrical surface of the scanner and the attitude of the tape path relative to the cylindrical surface of the scanner, in a common direction with said adjustments being facilitated by said common direction being substantially parallel to the plane of the tape; said tape path adjustment is accomplished with a guide post having a tape edge guide affixed thereto, said guide post being slidably affixed on a mounting block by a retaining rod flexibly affixed in said mounting block and first spring means for applying force through said guide post to said retaining rod in one slidable direction of said guide post while a first screw is threaded through said mounting block along an axis parallel to the plane of the tape for adjusting the position of said guide post by moving said retaining rod relative to said first spring means; and wherein said tape attitude adjustment is accomplished with a mounting base on which said mounting block is pivotally affixed through a pivot pin while pivotal adjustment is provided therebetween with a second screw and second spring means for applying force between said mounting block and said mounting base to one side of said pivot pin, said second screw being threaded into said mounting base through said mounting block along an axis parallel to the plane of the tape and to the other side of said pivot pin for moving said mounting block relative to said mounting base and in cooperation with the force of said second spring means.

* * * * *